United States Patent [19]

Miyoshi et al.

[11] Patent Number: 4,465,518

[45] Date of Patent: Aug. 14, 1984

[54] PROCESS FOR STRENGTHENING SOFT SOIL

[75] Inventors: Hajime Miyoshi, Koganei; Etsuo Asanagi, Kashiwa; Osamu Terashima, Tokyo, all of Japan

[73] Assignee: Chiyoda Chemical Engineering & Const. Co., Japan

[21] Appl. No.: 388,145

[22] Filed: Jun. 14, 1982

[51] Int. Cl.³ .................. C04B 11/00; C04B 7/14; C04B 7/02
[52] U.S. Cl. ........................ 106/89; 106/97; 106/109; 106/117; 106/900; 404/76; 405/128
[58] Field of Search .............. 404/75, 76; 405/128, 405/129; 106/900, 89, 97, 117, 109, 110

[56] References Cited

U.S. PATENT DOCUMENTS

| | | | |
|---|---|---|---|
| 3,096,188 | 7/1963 | Maydl | 106/109 |
| 3,953,222 | 4/1976 | Bainton | 106/117 |
| 4,266,980 | 5/1981 | Chudo et al. | 106/900 |
| 4,299,516 | 11/1981 | Miyoshi et al. | 106/97 |
| 4,306,910 | 12/1981 | Miyoshi et al. | 106/109 |
| 4,353,749 | 10/1982 | Ray et al. | 106/109 |

FOREIGN PATENT DOCUMENTS

| | | | |
|---|---|---|---|
| 2549502 | 10/1976 | Fed. Rep. of Germany | 106/117 |
| 56-163204 | 12/1981 | Japan | 106/117 |
| 484200 | 9/1975 | U.S.S.R. | 106/117 |
| 759474 | 8/1980 | U.S.S.R. | 106/117 |

*Primary Examiner*—Gary P. Straub
*Attorney, Agent, or Firm*—Kenway & Jenney

[57] ABSTRACT

A high water content soft soil, for example from the sea or river bed, may be improved in strength by incorporating thereinto a finely divided, quenched iron blast furnace slag treated with sulfuric acid, and a Portland cement. The sulfuric acid-treated slag is a product obtained by reacting a finely divided, quenched iron blast furnace slag, such as a water-granulated iron blast furnace slag, with sulfuric acid to convert a part of its calcium components into gypsum.

10 Claims, No Drawings

PROCESS FOR STRENGTHENING SOFT SOIL

BACKGROUND OF THE INVENTION

This invention relates to a method for improving the strength of water-saturated soft soils.

It is generally known from past experience that a water-saturated soft soil deposited on the bottom of seashore, river, lake and lagoon must be strengthened to enable passage of people or traffic vehicles or conveyance of construction machines on reclaimed soft grounds formed by dredging such water-saturated soft soil. In one such method, a strengthening agent or solidifying agent comprising a cement, quick lime, water glass, asphalt or organic macromolecular substance is added to the soft soil. However, this method is not altogether satisfactory since these strengthening agents are poor in strength-improving effect or are economically unfeasible. Especially, in the case of the large-scale treatment of soft soil of a high water content, such as a certain kind of sludge or mud called "hedoro" deposited on the bottom of rivers or the seashore, the amount of soil to be treated in one batch may reach several thousand to several million cubic meters, thus requiring the addition of an extremely large amount of the strengthening agent, and hence the strengthening agent employed should be as cheap as possible and should be capable of significantly improving the sail strength even in smaller amounts.

In U.S. Pat. No. 4,299,516, there is disclosed a method in which a water-saturated soft soil is improved in its strength by incorporating thereinto an additive composed of gypsum and a mixture of Portland cement and a water-granulated iron blast furnace slag. Whilst this method may impart a desirable strength to the soft soil, it is not quite satisfactory from an economic or ecological point of view.

SUMMARY OF THE INVENTION

It is, therefore, an object of the present invention to provide an effective process of improving the strength of a water-saturated soft soil with high efficiency within a relatively short period of time.

Another object of the present invention is to provide an economical process of improving the strength of a water-saturated soft soil with the effective utilization of industrial wastes.

In accomplishing the foregoing objects, there is provided in accordance with the present invention a process of improving the strength of a water-saturated soft soil, which comprises admixing the soft soil with ingredient A including a finely divided, quenched iron blast furnace slag having a part of its calcium components converted into gypsum by treatment with sulfuric acid and ingredient B including a Portland cement. The ratio by weight of ingredient A to ingredient B is within the range from 70/30 to 35/65. Preferably, the soft soil is admixed with ingredient A before or simultaneously with ingredient B.

Other objects, features and advantages of the present invention will become apparent from the detailed description of the invention to follow.

DETAILED DESCRIPTION OF THE INVENTION

The process of the present invention includes admixing a water-saturated soft soil with ingredient A and ingredient B to cause various chemical reactions for improving the strength of the soft soil to take place between the components of ingredients A and B and between soft soil components and the components of ingredients A and B.

Ingredient A includes a product obtained by treating a finely divided, quenched iron blast furnace slag with sulfuric acid to convert a part of the calcium components of the slag into gypsum. This treatment also serves to activate the silica and alumina components present at the surface of the slag particles with the simultaneous increase in specific surface area of the slag particles.

The finely divided, quenched iron blast furnace slag used as the precursor material of ingredient A is prepared from a slag by-product of an iron blast furnace by rapidly cooling the slag to form coarse granules, and then finely dividing the granules to a particle diameter of 300 $\mu$m or less. The cooling may be effected either by a wet process in which the slag is rapidly cooled with water or by a semi-dry or dry method in which air is used for cooling with or without the aid of a small amount of water. The wet method can yield sand-like granules having a particle size of 1-5 mm, generally called water-granulated iron blast furnace slags, which are suited for the production of ingredient A. The composition of the water-granulated iron blast furnace slags varies according to the composition of iron ores used and the operation conditions of the blast furnace but is generally as follows:

$SiO_2$ 30–35%, $Al_2O_3$ 13–18%, CaO 38–45%, $Fe_2O_3$ 0.5–1.0%, MgO 3–6%, S 0.5–1.0%, MnO 0.5–1.5%, and $TiO_2$ 0.5–1.0%

It is important that the precursor slag should have a latent hydraulic property. Iron blast furnace slags having such a property can be obtained by rapidly cooling a slag by-product from an iron blast furnace in such a manner as to prevent its crystallization and to form a non-crystalline (glassy) slag without its energy of crystallization being lost. Slag granules obtained by slowly cooling the slag by-product are fine crystals composed mainly of melilites (gehlenite $Ca_2Al_2SiO_7$·Akermanite $Ca_2MgSi_2O_7$ series solid solution) and calcium orthosilicate and have no hydraulic property. Since the product obtained by treating such a crystalline slag with sulfuric acid also fails to exhibit the hydraulic property required for strengthening the soft soil, it cannot be used in the process of this invention. It is also important that the precursor slag should be finely pulverized. The use of granules having a particle size of 1–5 mm as the precursor material is undesirable because of their low reactivity with sulfuric acid and, thus, poor reactivity of the resulting slag (ingredient A) with the soft soil being treated and with the cement (ingredient B). For this reason, the use of finely pulverized, quenched iron blast furnace slag having a particle size of 300 $\mu$m or less, especially 100 to 1 $\mu$m as the precursor material for ingredient A is recommended.

The treatment of the precursor slag with sulfuric acid can be done by contacting, in a reaction zone, the slag with sulfuric acid added as such or formed in situ in the zone. In the former case, it is preferable to use spent sulfuric acid exhaused from various chemical plants or sulfuric acid secondarily produced in various systems such as a flue gas desulfurization system, from the standpoint of economy and ecology, though commercially available sulfuric acid may of course be used. In the reaction zone, the precursor slag is mixed with sulfuric acid for reaction therewith and the mixture is separated into a solids-rich phase and a liquid phase. The solids-rich phase may be recycled to the reaction zone for further reaction with sulfuric acid, if necessary. The liquid phase may also be recycled to the reaction zone with or without being replenished with fresh sulfuric acid. As described previously, through the reaction between the slag and sulfuric acid, the silica and alumina contained in the slag are activated while a part of the calcium oxide is converted into calcium sulfate. Since calcium sulfate is low in solubility, it may exist, for the most part, as solids in the form of gypsum (calcium sulfate dihydrate). However, some of the other components of the slag such as MgO and $Al_2O_3$ can be dissolved in the mixture. In order to minimize the loss of MgO, $Al_2O_3$, etc. as well as the gypsum formed in situ (solubility of gypsum in water at room temperature is about 0.2% in terms of $CaSO_4$), it is preferred that the liquid phase (mother liquor) obtained in the separation step be recycled to the reaction zone for use use as diluent.

An example of the latter case in which the slag is treated with sulfuric acid formed in situ is that where, in a suitable contacting zone, such as a scrubber, a sulfur oxidescontaining gas, such as a waste flue gas, is contacted with a dispersion of the slag in water while maintaining the pH of the dispersion in the range of 1.5–4.0. The slag thus treated with sulfuric acid is recovered from the effluent dispersion. In this case, the slag acts as an absorbent for the sulfur oxides and the spent slag is used as ingredient A of this invention.

In either case, it is preferred that 20–500 g, most preferably, 50–300 g of sulfuric acid (as 100% $H_2SO_4$), be reacted with 1 kg of the slag. In other words, the reaction between the slag and sulfuric acid is preferably continued until 20–500 g, more preferably 50–300 g of sulfuric acid, in terms of 100% sulfuric acid, have been reacted with 1 kg of the slag. Good results are obtainable when about 2–60%, especially about 3–35% of the calcium components of the slag are converted into gypsum by the reaction between the slag and sulfuric acid.

Ingredient B used in the process of this invention is a Portland cement. An Ordinary Portland cement satisfying the specification defined in JIS R-5210 for "Portland cements" is suitable for use as the Portland cement in ingredient B. According to the nature of a water-saturated soft soil and the treatment conditions, other Portland cements such as a moderate heat Portland cement, a high early strength Portland cement and/or an ultrahigh early strength Portland cement may also be used.

Preferably, the ratio by weight of ingredient A to ingredient B is in the range from 70/30 to 35/65. In addition to ingredients A and B, suitable additives may be used, if desired, for the purpose of expediting the strength improving reactions, for improving affinity of ingredients A and B for the soft soil to be treated and/or for deodorizing the soft soil. It is preferred when treating a soft soil with a strongly unpleasant odor to incorporate therein a water-soluble, organic or inorganc ferrous salt in an amount effective to deodorize the soil, as described in U.S. Pat. No. 4,306,910, the disclosure of which is hereby incorporated by reference.

In a preferred embodiment of the invention, the water-saturated soft soil to be treated is first admixed with ingredient A (first treatment step) so that the soft soil may be made reactive with ingredient B to be added in a subsequent second treatment step. The addition of ingredient A into soft soil may be carried out without encountering any difficulty by means of any mixing machine such as a rotating-blade type mixing device. The first treatment step can convert the soft soil into a state permitting homogeneous mixing with ingredient B with a high workability. Further, since the first treatment step can provide soft soil with a suitable amount of gypsum dissolved in its water phase (solubility of gypsum is about 0.2 g in terms of $CaSO_4$ per 100 g water), a reaction resulting in the formation of ettringite ($3CaO \cdot Al_2O_3 \cdot 32 H_2O$) can take place easily between the soft soil and ingredients A and B in the second treatment step.

The water-saturated soft soil thus enhanced in reactivity in the first treatment step is then admixed with ingredient B (second treatment step). Upon the addition of ingredient B to the preformed mixture of soft soil and ingredient A, the hydration of ingredient B takes place. Moreover, the hydration of ingredient B can give rise to various other reactions for improving the strength of the water-saturated soft soil, including a reaction between ingredients A and B themselves and a reaction between the soft soil and ingredients A and B. The reactions for improving the strength of the soft soil proceed with good efficiency because the soft soil to which the ingredient A has been added is converted into a preferred reaction medium for the strength-improving reactions and because ingredient B may be easily mixed homogeneously with the soft soil having ingredient A added thereto.

In this preferred treatment procedure, a cation exchange reaction, a reaction resulting in the formation of ettringite, a Pozzolan reaction and other reactions are believed to take place between respective components of ingredient A, ingredient B and the soft soil. As the water-saturated soft soil has been homogeneously admixed with ingredient A in the first step of the treatment, the reactions for improving the strength of the soft soil take place smoothly throughout the treated soft soil upon addition of the ingredient B, whereby rapid improvement in strength of the soft soil is attained.

Thus, it is most preferred that the soft soil be admixed first with ingredient A and subsequently with ingredient B. A method in which the water-saturated soft soil is admixed with ingredients A and B simultaneously is advantageous over a method in which the soft soil is admixed first with ingredient B and then with A, because the latter method requires a specific mixing device to attain homogeneous mixing. More specifically, when the soft soil is admixed first with ingredient B, the $Ca^{2+}$ and $OH^-$ of the cement can adversely affect the viscosity, gel strength and pH of the soft soil to the extent that the homogeneous mixing of the soft soil with ingredient B is inhibited. This also inhibits the homogenous mixing of ingredient A with the soft soil so that the reactions for improving the strength of the soil cannot proceed satisfactorily. By properly specifying the order of addition of ingredients A and B, the workability in strengthening the soft soil may be improved and chemical properties of respective components of ingredients A and B may be effectively utilized for improving the strength of the soft soil.

As noted previously, the prominent feature of this invention resides in the use of, as a component for improving the strength of soft soils, finely divided, quenched iron blast furnace slag which has been treated with sulfuric acid. The treatment of the slag with sulfuric acid converts a part of the calcium components thereof into gypsum with the simultaneous activation of its silica and alumina trace components. Additionally, some of the other components present in the slag are temporarily converted into sulfates and dissolved in the reaction mixture. The dissolved sulfates can again precipitate and deposit on the slag particles. As a result of these complicated reactions, the slag treated with sulfuric acid is imparted with properties which are quite different from those of non-treated slags. That is, the slag treated with sulfuric acid exhibits a superior strength-improving effect on water-saturated soft soils in comparison with a mere mixture of gypsum and non-treated iron blast furnace slag. Whilst the slag treated with sulfuric acid itself shows no noticeable hydraulic property, it begins to exhibit such a property when brought into contact with a slaked lime produced in situ in the soft soil being treated by hydration of the Portland cement added thereto.

In the process of this invention, the strength of the treated soft soil is improved effectively and quickly, since strength-improving reactions such as the reaction for the formation of ettringite and cation exchange reactions can effectively proceed by virtue of the excellent reactivity of the slag treated with sulfuric acid.

Both ingredients A and B can be used either in a powdery form or slurried form in the process of this invention.

Generally, the nature of the soft soil being treated has an influence upon the strength-improving performance of the process of this invention. That is, the kind of the clay minerals, the content of fine soil components, the content of organic materials and the water content of the water-saturated soft soil all influence the reactions which improves the strength of the soft soil. However, generally required level of strength can be achieved according to the present invention by admixing the soft soil with about 50–100 kg of additive (i.e. total amount of ingredients A and B, in dry state) per cubic meter of the soft soil. While the known method cannot be practically applied to the treatment of soft soils having a large content of organic materials, the process of this invention can impart satisfactory strength to such soils by merely increasing the amount of the additive to about 1.5 times the amount in the usual case. Such an increase is not necessary when the soft soil contains a large amount of highly reactive soil components, however.

The process of the present invention is applicable to soft soils having a wide range of water contents, for example, a water content of 50–200% or even to highly water-saturated soft soils having water content as high as 500–1000%. When the process of this invention is applied to a highly-saturated soft soil, excess water will be separated from the treated soft soil onto the surface thereof upon breeding.

In the process of the present invention, the amount of the Portland cement used is relatively small, so that the generation of heat resulting from the hydration reaction of the cement is generally insufficient to cause an undesirable development of strain in the treated soft soil. Moreover, the quantity of residual alkalis in the treated soft soil also is small, so that no significant increase in alkali concentration is found in the treated soft soil, and the risk of erosion of the treated soil by e.g. sewer or sea water is minimized. The present invention is also advantageous in that it requires a relatively small amount of the additive and, in particular, in that the amount of the Portland cement is small. Moreover, iron blast furnace slags discharged as an industrial waste from, for example, desulfurization systems, can be used as such for the process of this invention. Thus, this invention is also advantageous from the standpoint of ecology. The process of this invention is advantageously applied not only for improving the strength of reclaimed soft grounds but also for improving the nature of soft soil or sludge deposited on sea and river beds.

The following examples will further illustrate the present invention. In Examples 1–5, a commercially available water-granulated iron blast furnace slag (specific surface area: 3600–4000 $cm^2/g$ measured according to Blaine's air permeability method (i.e. average particle diameter of about 4 $\mu m$), composition: $SiO_2$ 32–35%, $Al_2O_3$ 15–16%, CaO 41–44%, MgO 4–6%, $Fe_2O_3$ 0.5–1.2% and S 0.8–1.0, a vitreous substance free from crystalline substances as determined by X-ray diffraction) was used as a precursor material for ingredient A and Ordinary Portland cement (specific surface area: 3300 $cm^2/g$ measured according to Blaine's air permeability method) was used as ingredient B. In Examples 1–4, a muddy marine deposit having a water content of 260% (particle size distribution: 0–2 $\mu m$ 14%, 2–5 $\mu m$ 42%, 5–10 $\mu m$ 19% and 10–20 $\mu m$ 25%; an average particle diameter: 7 $\mu m$) and a density of 1.21 $g/cm^3$ at a water content of 260% was used as the water-saturated soft soil to be treated.

EXAMPLE 1

100 kg of the water-granulated iron blast furnace slag was added into 400 kg of a first, diluted sulfuric acid solution containing 26.8 kg of $H_2SO_4$ and the mixture was allowed to ract at room temperature for 2 hours with stirring. The resulting mixture was filtered to obtain a first, $H_2SO_4$-treated slag and a first mother liquor. The first mother liquor was admixed with water and conc. sulfuric acid to obtain 400 kg of a second sulfuric acid solution containing 26.8 kg of $H_2SO_4$. Using the second sulfuric acid solution in place of the first solution, another 100 kg of the slag was treated in the same way as above, to obtain a second, $H_2SO_4$-treated slag and a second mother liquor, the latter being admixed with water and conc. sulfuric acid so that 400 kg of a third sulfuric acid solution containing 26.8 kg of $H_2SO_4$ were obtained. A further 100 kg of the slag was reacted with the third sulfuric acid solution at room temperature for two hours with stirring. The resulting mixture was in the form of slurry containing needle-like crystals of gypsum. The slurry was then subjected to a centrifugal treatment to separate 195 kg of a third, $H_2SO_4$-treated slag containing 32.5 wt % of the mother liquor (137 kg on air dried basis).

The water-saturated soft soil was treated in accordance with the process of this invention using the third, $H_2SO_4$-treated slag as ingredient A. Thus, to 1 $m^3$ of the soft soil was added 36.7 kg (air dried basis) of ingredient A and the mixture was homogeneously mixed in a kneader. To the mixture was then added 30.5 kg of ingredient B and the whole was thoroughly mixed in the kneader. A sample of the mixture was then injected into a cylindrical mold of 50 mm inside diameter and 100 mm height. The mold was placed in a humidity box maintained at a constant temperature of 20 ±1° C. and saturated humidity for a given period of time to effect curing of the sample within the mold. Then the cured sample was released from the mold for the measurement of its unconfined compressive strength in accordance with JIS A 1216T, 1976.

For the purpose of comparison, a similar test was performed in the same manner as above except that the non-treated, precursor slag was used in place of the ingredient A. The results were as shown in Table 1.

In addition, a further test was carried out in the same manner as above except that a mixture of 13.2 kg of a gypsum and 23.5 kg of a water-granulated iron blast furnace slag was used in place of the ingredient A. The unconfined compressive strength of the treated soil at an age of 14 days was 1.3 kgf/cm$^2$.

TABLE 1

| | Unconfined Compressive Strength (kgf/cm$^2$) Age in days | | | |
|---|---|---|---|---|
| | 3 | 7 | 14 | 28 |
| Example 1 | 0.72 | 1.30 | 1.60 | 1.95 |
| Comparative Example | 0.22 | 0.66 | 0.80 | 0.98 |

EXAMPLE 2

Ten types of slags having various amounts of sulfuric acid, such as shown in Table 2, reacted therewith were prepared. Using each of the slags as ingredient A, the treatment of the soft soil was conducted in the same manner as described in Example 1 except that ingredient A was used in an amount of 30.6 kg and ingredient B was used in an amount of 36.6 kg. The unconfined compressive strength of the treated soft soil at an age of 14 days was measured to give the results as shown in Table 2.

TABLE 2

| Experiment No. | Amount of Sulfuric Acid Reacted with the Presursor Slag (g/kg) | Unconfined Compressive Strength (kgf/cm$^2$) |
|---|---|---|
| 1 | 0 | 0.80 |
| 2 | 20 | 1.00 |
| 3 | 40 | 1.32 |
| 4 | 80 | 1.44 |
| 5 | 100 | 1.54 |
| 6 | 200 | 1.63 |
| 7 | 300 | 1.57 |
| 8 | 400 | 1.35 |
| 9 | 500 | 1.02 |
| 10 | 600 | 0.75 |

EXAMPLE 3

A test was performed in the same manner as described in Example 1 except that the proportion of ingredient A to ingredient B was varied. The unconfined compressive strength of each of the treated soft soils after 14 and 28 days was as shown in Table 3.

TABLE 3

| Experiment No. | Ratio by weight of ingredient A to ingredient B (A/B) | Unconfined Compressive Strength (kgf/cm$^2$) Age in days | |
|---|---|---|---|
| | | 14 | 28 |
| 1 | 75/25 | 0.52 | 1.08 |
| 2 | 70/30 | 0.93 | 1.43 |
| 3 | 65/35 | 1.38 | 1.74 |
| 4 | 62/38 | 1.45 | 1.81 |
| 5 | 60/40 | 1.52 | 1.85 |
| 6 | 55/45 | 1.58 | 1.91 |
| 7 | 50/50 | 1.53 | 1.84 |
| 8 | 45/55 | 1.25 | 1.53 |
| 9 | 40/60 | 0.93 | 1.28 |
| 10 | 35/65 | 0.76 | 1.12 |
| 11 | 30/70 | — | 0.96 |

EXAMPLE 4

To 83.3 kg of 9% sulfuric acid were added 27.9 kg of the water-granulated iron blast furnace slag and the mixture was stirred for 2 hours. After being cooled to room temperature, the mixture was further mixed with 30.5 kg of ingredient B to obtain a slurry. The entire amount of the slurry was admixed into 1 m$^3$ of the soft soil by means of a kneader. The unconfined compressive strength of the treated soil was measured in the same manner as in Example 1 to reveal that the strength at an age of 14 days was 1.48 kgf/cm$^2$.

EXAMPLE 5

A river sediment having a water content of 348.4% (particle size distribution: 0–5 $\mu$m 46%, 5–20 $\mu$m 49% and above 20 $\mu$m 5%; an average particle diameter: 5.2 $\mu$m), a density of 1.15 g/cm$^3$ at a water content of 348%, a pH value of 8.0 and an ignition loss of 23.7% was treated in accordance with the process of this invention. This soft soil had unpleasant odor and the gas evolved therefrom contained 1800–2000 ppm of hydrogen sulfide. This soft soil had a total hydrogen sulfide content of 430 mg (12.6 m-mol)/kg, an insoluble sulfide content of 2386 mg (70.2 m-mol)/kg and a total organic matter content of 21.2 wt %/kg. The total hydrogen sulfide content was determined by measuring, by iodometry, the quantity of free hydrogen sulfide distilled off during steam distillation of the soft soil to be treated. The insoluble sulfide content was determined by adding concentrated sulfuric acid to the distillation residue obtained in the analysis of the total hydrogen sulfide, subjecting the mixture again to steam distillation, and analyzing the quantity of hydrogen sulfide distilled. The organic matter content was measured by a testing method using chromic acid.

To 1 m$^3$ of the odorous soft soil were added 5 l of ingredient C (an aqueous solution of ferrous sulfate having a Fe$^{++}$ concentration of 15.6 g (0.28 mol)/l), 70 kg (air dried basis) of ingredient A (the same as used in Example 1) and 58 kg of ingredient B in the order as indicated in Table 4 and the mixture, after each addition of respective ingredients, was thoroughly mixed in a mill. The mixture was then molded in the same manner as described in Example 1 to obtain a molding. Each mold was then subjected to a series of tests to measure its unconfined compressive strength at an age of 14 days, the amount of hydrogen sulfide evolved therefrom, the degree of unpleasant odor and the pH value according to the elusion test stipulated in Notification No. 13 of the Japanese Ministry of Environment. The result of the tests is shown in Table 4.

In Table 4, C+A, indicates simultaneous addition of the ingredients C and A. The marks given with respect to evaluation of unpleasant odour have the following meanings:

+ ... very weak
++ ... strong

TABLE 4

| Order of addition of the ingredients | | | Unconfined compressive strength (kgf/cm$^2$) | H$_2$S (ppm) | Evaluation of unpleasant odor | pH |
|---|---|---|---|---|---|---|
| (1) | (2) | (3) | | | | |
| C | A | B | 1.30 | trace | + | 9.3 |
| C+A | B | — | 1.28 | " | + | 9.3 |
| A | B | — | 1.37 | 5 | ++ | 9.5 |

We claim:

1. A process for improving the strength of a water-saturated soft soil comprising:

providing a finely divided, non-crystalline, calcium-containing iron blast furnace slag;

treating said slag with an aqueous solution containing 20–500 g sulfuric acid per 1 kg of slag to provide an acid-treated slag (A) with conversion of a part of the calcium content of said slag to gypsum;

admixing said acid-treated slag with the soft soil to be treated; and admixing said acid treated slag and the soft soil with (B) a Portland cement to obtain an unconfined compressive strength of the soil greater than that obtained by using comparable amounts of cement, calcium sulfate and unacidified slag.

2. A process as recited in claim 1, wherein the ratio by weight of ingredient (A) to ingredient (B) is about 70/30 to 35/65.

3. A process as recited in claim 1, wherein the slag has a particle size of 300 μm or less.

4. A process as recited in claim 3, wherein the slag is a water-granulated iron blast furnace slag.

5. A process as recited in claim 1, wherein the soft soil is admixed with ingredient (A) before admixture with ingredient (B).

6. A process as recited in claim 1, wherein the soft soil is admixed with ingredient (A) and ingredient (B) simultaneously.

7. A process as recited in claim 6, comprising forming an aqueous slurry containing ingredients (A) and (B) and admixing the soft soil with said slurry.

8. A process as recited in claim 1, further comprising admixing said soft soil with a water-soluble ferrous salt, prior to the addition of ingredient (B), in amount effective to deodorize said soil.

9. The process of claim 1 wherein about 2–60% of the calcium components of the slag are converted into gypsum by reaction with the sulfuric acid.

10. The process of claim 1 wherein about 3–35% of the calcium components of the slag are converted into gypsum by reaction of the sulfuric acid.

* * * * *